US011870700B2

(12) United States Patent
Arora et al.

(10) Patent No.: US 11,870,700 B2
(45) Date of Patent: Jan. 9, 2024

(54) MONITORING A COMMUNICATION NETWORK

(71) Applicant: Hughes Network Systems, LLC, Germantown, MD (US)

(72) Inventors: Amit Arora, Germantown, MD (US); Archana Gharpuray, Germantown, MD (US); John Kenyon, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 2 days.

(21) Appl. No.: 17/485,946

(22) Filed: Sep. 27, 2021

(65) Prior Publication Data

US 2022/0014471 A1  Jan. 13, 2022

Related U.S. Application Data

(62) Division of application No. 16/172,021, filed on Oct. 26, 2018, now Pat. No. 11,134,016.

(51) Int. Cl.
*H04L 47/127* (2022.01)
*H04L 43/045* (2022.01)
*H04L 43/06* (2022.01)

(52) U.S. Cl.
CPC .......... *H04L 47/127* (2013.01); *H04L 43/045* (2013.01); *H04L 43/06* (2013.01)

(58) Field of Classification Search
CPC ............................. G06N 20/00; H04L 47/127
See application file for complete search history.

(56) References Cited

U.S. PATENT DOCUMENTS

| 10,735,273 | B2 * | 8/2020 | Kaplunov | G06Q 10/0639 |
| 10,778,547 | B2 * | 9/2020 | Halepovic | G06N 20/00 |
| 10,797,938 | B2 * | 10/2020 | Tiwari | H04L 41/0645 |
| 10,812,178 | B2 * | 10/2020 | Peponides | H04B 7/18513 |
| 10,979,307 | B2 * | 4/2021 | Nunna | G06N 3/045 |
| 2014/0337277 | A1 * | 11/2014 | Asenjo | G06Q 10/06 707/603 |

(Continued)

OTHER PUBLICATIONS

Al-Zaidy et al., "Data-driven models for satellite state-of-health monitoring and evaluation," International Journal of Robotics and Mechatronics, May 2018, 5(1):1-12.

(Continued)

*Primary Examiner* — Douglas B Blair
(74) *Attorney, Agent, or Firm* — Fish & Richardson P.C.

(57) ABSTRACT

Methods and systems for monitoring a communication network using machine-learning techniques are disclosed. In some implementations, a forecasted amount of traffic for a communication network is determined using one or more network traffic forecasting models being configured to generate the forecasted amount of traffic based on data indicating one or more previous amounts of traffic for the communication network. A measure of network health is generated based on a measured amount of traffic and the forecasted amount of traffic. Data indicating one or more characteristics of the communication network is processed using one or more machine learning models to generate a predicted measure of network health for a future time period. An indication of the predicted measure of network health for the future time period is provided.

20 Claims, 5 Drawing Sheets

(56) References Cited

U.S. PATENT DOCUMENTS

| | | | |
|---|---|---|---|
| 2015/0379427 A1* | 12/2015 | Dirac .................... | G06N 20/00 |
| | | | 706/12 |
| 2015/0379429 A1* | 12/2015 | Lee ......................... | G09B 5/00 |
| | | | 706/11 |
| 2016/0098291 A1* | 4/2016 | Kondaveeti ......... | G06F 11/3003 |
| | | | 718/1 |
| 2017/0180214 A1* | 6/2017 | Azevedo ............... | H04L 43/045 |
| 2018/0004197 A1 | 1/2018 | Feenstra et al. | |
| 2018/0278486 A1 | 9/2018 | Mermoud et al. | |
| 2018/0278487 A1 | 9/2018 | Mermoud et al. | |
| 2019/0036789 A1* | 1/2019 | Kaplunov ......... | G06Q 10/06393 |
| 2019/0200244 A1* | 6/2019 | Polepalli ............... | H04W 36/06 |
| 2019/0239101 A1* | 8/2019 | Ouyang ................ | G06N 3/084 |
| 2019/0258756 A1* | 8/2019 | Minwalla .............. | H04L 41/145 |
| 2019/0281476 A1* | 9/2019 | Lyon ....................... | H04L 41/16 |
| 2019/0335342 A1* | 10/2019 | Jacinto ................. | H04W 24/02 |
| 2019/0342183 A1* | 11/2019 | Nunna ................... | G06N 3/006 |
| 2020/0204860 A1* | 6/2020 | Gerszberg ............ | H04W 16/26 |
| 2023/0179479 A1* | 6/2023 | Gibbon .............. | H04L 43/0817 |
| | | | 709/221 |

OTHER PUBLICATIONS

Barua et al., "A Diagnostic Tree Approach for Fault Cause Identification in the Attitude Control Subsystem of Satellites," IEEE Transactions on Aerospace and Electronic Systems, Jul. 2009, 45(3):983-1002.

Gao et al., "Fault detection and diagnosis for spacecraft using principal component analysis and support vector machines," Presented at 7th IEEE Conference on Industrial Electronics and Applications (ICIEA), Jul. 2012, pp. 1984-1988.

International Preliminary Report on Patentability in International Appln. No. PCT/US2019/057207, dated May 6, 2021, 13 pages.

International Search Report and Written Opinion in International Appln. No. PCT/US2019/057207, dated Feb. 12, 2020, 21 pages.

Invitation to Pay Additional Fees in International Appln. No. PCT/US2019/057207, dated Dec. 18, 2019, 15 pages.

Yin et al., "Satellite Fault Diagnosis Using Support Vector Machines Based on a Hybrid Voting Mechanism," The Scientific World Journal, Aug. 12, 2014, 2014(582042):1-11.

\* cited by examiner

MONITORING A COMMUNICATION NETWORK

CROSS-REFERENCE TO RELATED APPLICATIONS

This application is a divisional of U.S. application Ser. No. 16/172,021, filed Oct. 26, 2018, now allowed, which is incorporated by reference.

BACKGROUND

Communication systems can include complex networks of multiple individual subsystems, where each subsystem further includes multiple software and hardware components. The capability of the communication network to perform a particular task may depend upon the condition of the network, which in turn depends upon the operational status of many individual subsystems and components. Each subsystem, software component, and hardware component can generate status and statistic information related to the operational status of the subsystem or component.

SUMMARY

In some implementations, a communication system, e.g., a satellite communication network, can train and use machine-learning models to output a current condition for the communications system, where the current condition indicates the system's capability for performing various system tasks. The current condition can be, for example, a measure of network health ("MoNH") that provides a quantitative metric indicating the overall operability of the communications network at a particular time. Generally, the MoNH will depend upon the condition and operability of various subsystems, software components, and hardware components of the communication network. The MoNH can indicate, for example, whether the communication network is operating in a degraded state.

The system can use multiple models to generate the MoNH for a communication network. The system applies two machine learning techniques that are used together. The first technique uses a traffic forecasting model, which has been trained using time series data indicating historical traffic data to predict expected levels of traffic at future times. The traffic forecasting model can be run for various time periods to generate traffic forecasts, and MoNH values can be calculated using those forecasts, e.g., as a ratio of forecasted traffic for a time period and the actual traffic for the time period. In some implementations, the traffic forecasting model is trained based on time and traffic levels alone, so the traffic forecasting model can predict traffic for a network based on only input representing a time for which a forecast is desired. In other implementations, the model may be trained to use other input features to generate a forecasted amount of traffic.

The second technique collects information about the status of various network components and generates feature vectors to represent the state of the communication network at different times. As a result, a series of data sets each including the network state feature vector, the predicted traffic, the actual traffic, and the MoNH for different time periods are available. A machine learning model is trained, using these data sets, to predict MoNH based on lagged or delayed values of the network state feature vector. Because the MoNH prediction model is trained to indicate the MoNH of the network at a point in the future, when a current network state feature vector is provided, the model can provide a prediction of the MoNH for a predetermined amount of time in the future (e.g., one hour, four hours, one day, etc.). In some implementations, if predictions for multiple different time periods in the future are desired, multiple MoNH prediction models can be trained, each with a different predetermined time offset between the network state vectors and MoNH target values used in training.

As an example of training with lagging data, the training process can use training examples where the input is a feature vector for the state of the network at one time, and the target output for the model is the MoNH for a later time. The training data examples can all have a consistent time offset between the time of the status vector and the time of the MoNH value. As a result, providing a current network state feature vector causes the model to output a predicted MoNH value for a time at a predetermined offset in the future. With the models defined in this way, the system can generate the MoNH, which is defined in reference to traffic levels, without any traffic levels being input to the models. In other words, the MoNH measure representing overall data traffic capability of the network can be predicted by using only the status or state of certain network components, without the models needing any measures of current or recent data traffic over the network.

To output the MoNH for a current time, the system can collect current status and statistic information from various subsystems, hardware components, and software components of the system. For example, the system may collect status data (e.g., active, inactive, error state, etc.), metrics and statistics (e.g., current data transmission speeds, peak data transmission speeds, the number of items in a queue, number of dropped packets, average network traffic, peak network traffic, etc.), error and alarm data, error rates, and/or other appropriate information about the status or operation of the component. The system can store the status and statistic information in a network attached storage (NAS) device for later retrieval. The system can provide the current status and statistic information, along with historical status and statistic information retrieved from the NAS, to one or more machine learning models that are trained to determine the MoNH. The machine learning models may output a MoNH for the entire network as a whole, or one or more MoNH values for any subsystem, subgroup, or component of the network.

In some implementations, to output the network's MoNH, the one or more machine learning models may generate a network traffic forecast, which predicts the network traffic at a particular time period for a properly-functioning network. The models can forecast the network traffic using historical network traffic data, that is, data indicating a network traffic observed at previous time periods.

The models may determine the network's MoNH at a particular time period based on the forecasted amount network traffic for the particular time period and an actual measured network traffic for the particular time period (e.g., the MoNH can be the ratio of the actual measured network traffic to the amount of network traffic forecast for the particular time period).

In some implementations, the communication system can use trained machine learning models to output a predicted MoNH for one or more future time periods. For example, based on current and historical status and statistic information, a machine learning model can output a predicted MoNH for a future time period, along with a certainty of the prediction. In some implementations, the system outputs predicted MoNH values for multiple future time periods (e.g., for 30 minutes in the future, for 60 minutes in the future, etc.). By outputting one or more predicted MoNH values for future time periods, the system can determine when there is an impending network problem (e.g., whether the system is progressing into a degraded operational condition) and perform pre-emptive corrective actions. The MoNH values represent the health of the communication network as a whole, and thus also allow the system determine when there is a network-wide issue, or one that affects a significant portion of the network.

In response to the current MoNH and/or the one or more predicted future MonH values output by the machine learning models, the system can recommend and/or perform one or more actions. In some implementations, the one or more actions may themselves be determined by one or more machine learning models.

The actions can include generating a message to provide to an operator of the network. For example, the system can generate a message indicating the current and predicted MoNH values for display in a user interface of a client device. The actions can also include one or more network operations that alter the performance of a particular subsystem, a hardware component, or a software component. For example, the system can send an instruction to reset a particular component or to adjust a setting of a particular subsystem.

Other embodiments of these and other aspects of the disclosure include corresponding systems, apparatus, and computer programs, configured to perform the actions of the methods, encoded on non-transitory machine-readable storage devices. A system of one or more devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Various implementations may provide one or more of the following advantages. The machine learning models can output a quantitative MoNH for the entire communication network, providing a single metric useful for systems and operators in evaluating the condition of the communication system and recommending subsequent network actions. In some implementations, the machine learning models further provide predicted future MoNH values, enabling the system to detect potential network degradation and perform pre-emptive corrective actions before network performance is fully compromised.

The system uses machine learning models trained for the particular system network, enabling a more accurate estimate of the particular network's current and/or future condition than rules-based models that rely on predetermined thresholds based on generic networks. In some implementations, the system uses multiple different models to generate a particular machine learning output (e.g., a forecast network traffic, a current or future MoNH, a recommended system action), reducing uncertainty in the generated output by aggregating outputs of the individual models. The system can be expanded to support new or updated models as they become available.

The system can also retrain the machine learning models, e.g., as more network data becomes available, allowing the models to adapt to changes in the communication system over time and providing a more accurate measure of the communication system's actual operating condition.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
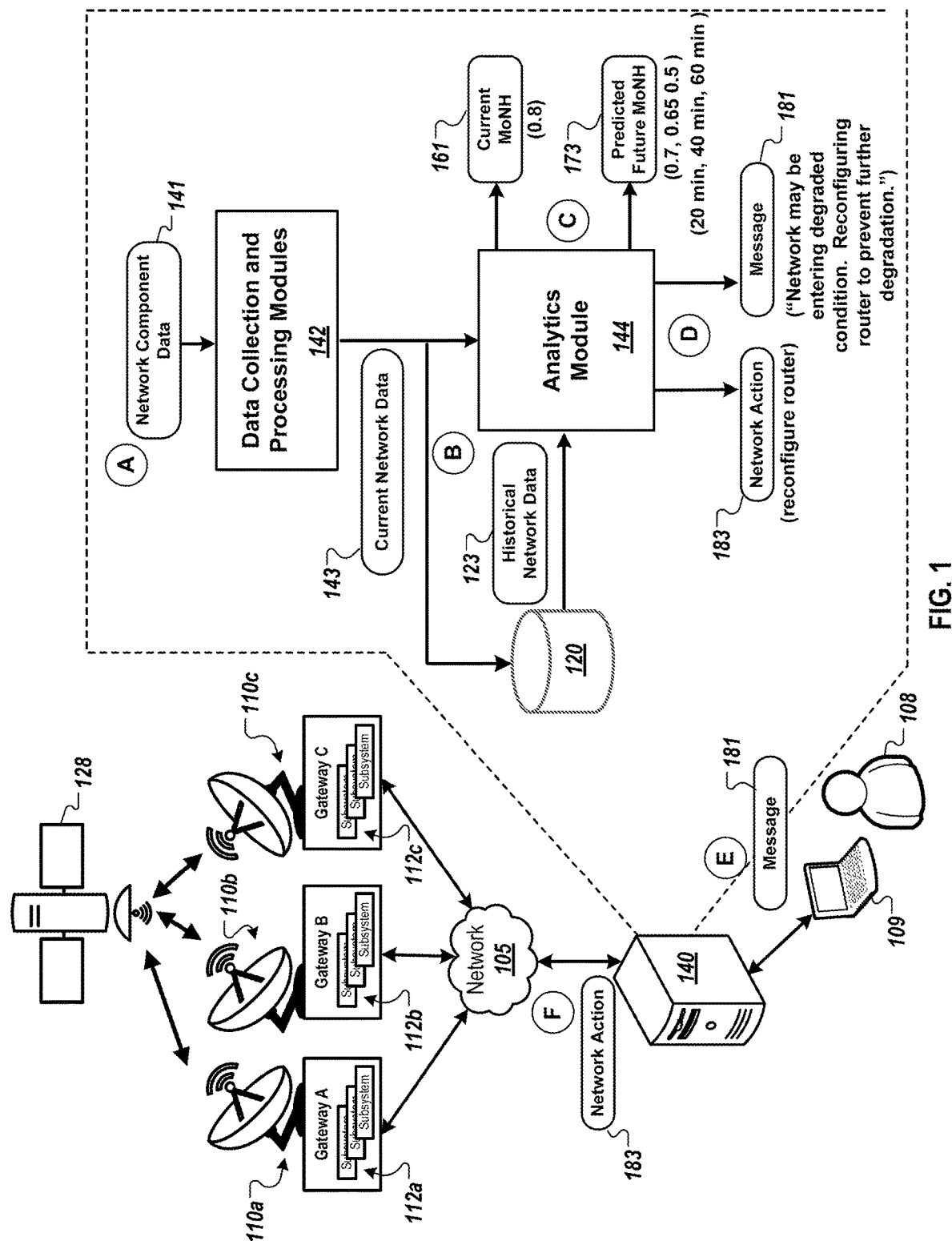
FIG. 1 is a diagram that illustrates an example of a system for monitoring a communication network.

FIG. 1 is a diagram that illustrates an example of a system 100 for monitoring a communication network, e.g. a satellite communication network. The example system 100 of FIG. 1 includes satellite gateways 110a, 100b, and 100c that communicate with a satellite 128. The system 100 also includes a computer system 140 that obtains information about the communication network, for example, by communicating with the satellite gateways 110a, 110b, and 110c over a communication network 105. The elements shown can be part of a larger satellite communication network that includes multiple satellites, multiple satellite gateways, and other elements not illustrated.

Using trained machine learning models, the computer system 140 monitors the condition of the communication system 100 by outputting a measure of network health (MoNH) 161 for the network, as well as one or more predicted future MoNH values 173, based on the information it obtains about the network. Based on the MoNH 161, the predicted future MoNH 173 and other network data, the system 140 can perform one or more actions, which may include generating a message 181 to provide to a user 108 (e.g., to a network operator) and/or performing an operation 183 to alter operation of the network. FIG. 1 includes stages (A) through (F), which indicate a flow of data.

A satellite communication system is complex system made up of many different subsystems, which in turn are made of multiple software and hardware components. To be able to determine and predict network health, a measure could be defined either as a quantified measure (i.e. as a real number) or as a qualitative measure. However, each network may have different characteristics, vulnerabilities, and traffic patterns, making it difficult to set rules or thresholds to interpret network health, much less predict network health in the future. Further, the characteristics of a network may change over time, making fixed or pre-set rules and thresholds ineffective for detecting problems in networks for many monitoring applications.

As discussed below, machine learning techniques can be used to generate a single, quantifiable measure of network health that does not depend on subjective thresholds or manual rules, and which can account for a network's unique traffic patterns and changing characteristics over time. The measure of network health, MoNH, can be determined for a current time period, as well as future time periods albeit with different degrees of certainty (e.g., the more distant the future the less the certainty). The MoNH may represent the state of the network as a single easily understandable value, e.g., a real number in the range [0, 1] such that 0 corresponds to a network outage and 1 corresponds to a network in perfect health. The technique is able to predict the MoNH value, along with a degree of certainty, which enables a network operator to determine if there is an impending network problem and take preemptive corrective actions before network performance degrades significantly.

The MoNH can be determined for the network as a whole or for any subgroup or portion of the network. For example, the MoNH can be defined for each service provider, for each beam, for each satellite gateway, and/or for the entire network comprising multiple gateways. The MoNH value for different subgroups can be aggregated together to determine the MoNH value for the next higher aggregate. For example, the MoNH for individual satellite beams can be aggregated together (e.g., averaged) to determine the MoNH value for a gateway which services the beams.

The satellite gateways 110a, 110b, and 110c are ground stations that manage data transmission to and from one or more satellites 128 of the communication system 100. The gateways 110a, 110b, and 110c may be geographically dispersed (i.e., situated in different geographic locations) and can include multiple subsystems and components that support the gateway operation. For example, the gateways 110a, 110b, and 110c can each include one or more antenna systems, transmitter systems, receiver systems, routers, networking systems, or other systems that support network communications within the communication system 100.

In system 100, the satellite gateways 110a, 110b, and 110c include subsystems 112a, 112b, and 112c, respectively. The subsystems 112a, 112b, and 112c include various hardware components and software components that support gateway operations. The subsystems 112a, 112b, and 112c can also include multiple instances of software processes that implement the subsystems or components. For example, the subsystems 112a, 112b, and 112c can include one or more IP traffic handling components, satellite forward channel handling component(s), and satellite return channel handling component(s), and various other components that support communications within the system 100.

The satellite gateways 110a, 110b, and 110c exchange data with the computer system 140. The system 140 can be, for example, one or more server systems that obtain data related to the communication network. The system 140 can be centralized or distributed, and may access computing resources that include CPUs, GPUs, high performance super-computing resources (HPSS), and/or distributed networked (e.g., cloud computing) resources.

The gateways 110a, 110b, and 110c exchange data with the system 140 over the communication network 105. The network 105 can include any combination of wired and wireless networks. For example, the network 105 can include one or more of a local area network (LAN), a wide-area network (WAN), the Internet, a broadband network, a fiber-optic transmission network, a cable network, Ethernet, a wireless data network, or other wired or wireless means for electronic data transmission.

In stage (A), the computer system 140 obtains network component data 141 that includes information about (e.g., properties of) the subsystems and components of the communication system. For example, the system 140 can include one or more data collection and processing modules 142 that receive and process data from various elements of the communication system 100. The network component data 141 can include information about the various subsystems and components of the satellites, gateways, and other elements that make up the satellite network. The computer system 140 can obtain the network component data 141 from one or more of the system elements. For example, the system 140 can obtain the network component data 141 from one or more of the satellite gateways 110a, 110b, 110c, which in turn can obtain information from the satellite 128, the subsystems 112a, 112b, and 112c, and/or other network elements. In another example, the system 140 can obtain the network component data 141 from a hub that obtains the information from one or more satellite gateways 110a, 110b, and 110c. In some implementations, the system 140 can obtain the network component data 141 directly from one or more of the subsystems 112a, 112b, and 112c, or from a component or software process of the subsystems 112a, 112b, and 112c.

The network component data 141 can include various information related to each of the subsystems, components, and their respective software instances. The information for a component can include status data (e.g., active, inactive, error state, etc.), metrics and statistics (e.g., current data transmission speeds, peak data transmission speeds, the number of items in a queue, number of dropped packets, average network traffic, peak network traffic, etc.), error and alarm data, error rates, and/or other appropriate information about the status or operation of the component. The type of information and the amount of information can vary based on the component or type of component. For example, the information for an IP traffic handling subsystem can be different from the information for a data storage component, e.g., for a network-attached storage (NAS) device.

The computer system 140 can obtain the network component data 141 periodically based on a specified time period, e.g., one minute, five minutes, one hour, or another appropriate time period. For each point in time or specified time period, the network component data 141 obtained by the system 140 represents a snapshot of the condition (e.g., the performance) of the overall communication network, or of a particular subsystem, subgroup, or component of the network, at that point in time or over that time period.

In stage (B), the analytics module 144 of the system 140 receives current network data 143 from the data collection and processing modules 142. The current network data 143 received by the analytics module 144 can include a network traffic handled by one or more elements of the system 100, a data transmission speed, a number of dropped packets, or other data related to the operation of one or more elements of the system 100 at a point in time or over a specified time period. The current network data 143 can include some or all of the network component data 141. The current network data 143 may be derived from the network component data 141 (e.g., by processing the data 141, by aggregating the data 141). The data collection and processing modules 142 may also provide the current network data 143 to a network attached storage (NAS) device 120 for later retrieval.

In stage (B), the analytics module 144 may also access historical network data 123 stored in the NAS device 120, where the historical network data 123 is current network data 143 that was provided to the NAS device 120 by the data collection and processing modules 142 during one or more previous time periods.

In stage (C), the analytics module 144 processes the current network data 143 and the historical network data 123 to determine a current measure of network health ("MoNH") 161 for the communication system 100. The MoNH 161 provides a quantitative metric for describing the operating condition (e.g., the "health") of the communication network. In some implementations, the MoNH 161 is a real number value in the interval from 0 to 1, inclusive, such that a MoNH of "0" corresponds to a network outage and a MoNH of "1" corresponds to a properly-functioning communication network.

The analytics module 144 can determine one or more MoNH 161 values for the communication system 100. For example, in some implementations, the analytics module 144 determines a MoNH 161 that describes the operational condition of the communication system 100, as a whole. In some implementations, the analytics module 144 determines a MoNH 161 that describes the operational condition of a particular subsystem, subgroup, or element of the system 100. For example, the analytics module 144 can determine a MoNH for a particular satellite gateway 110a, 110b, or 110c, or for a particular subsystem 112a, 112b, or 112c.

In some implementations, the MoNH 161 is determined by the ratio of the actual measured network traffic handled by the communication system 100 during a specified time period, $traffic_{actual}$, to a forecasted amount of traffic for that time period, $traffic_{forecast}$ (e.g., MoNH=$traffic_{actual}$/$traffic_{forecast}$) when the actual measured network traffic is less than the forecasted amount of traffic ($traffic_{actual}$<$traffic_{forecast}$) and the MoNH 161 is determined to be "1" when the actual measured network traffic is equal to or greater than the forecasted amount of traffic ($traffic_{actual}$≥$traffic_{forecast}$).

If the actual measured network traffic for a time period is significantly less than the forecasted amount of traffic for that time period, the MoNH 161 for that time period is low (e.g., closer to "0"), indicating that the communication system may be experiencing a network problem causing the traffic to fall below the expected values. If the actual measured traffic for the time period is greater than or equal to the forecasted amount of traffic for the time period, the MoNH 161 is equal to "1," indicating that the communication system is in proper operating condition.

Current MoNH values 161 for a particular subsystem, subgroup, or element of the system 100 can be determined similarly to the current MoNH 161 for the communication system 100 as a whole, but using the actual measured traffic handled by the particular subsystem, subgroup, or element, and the forecasted amount of traffic to be handled by the particular subsystem, subgroup, or element.

The actual measured network traffic handled by the network, subsystem, subgroup, or element during the specified time period can be determined by the analytics module 144 from the current network data 143.

Figure 2:
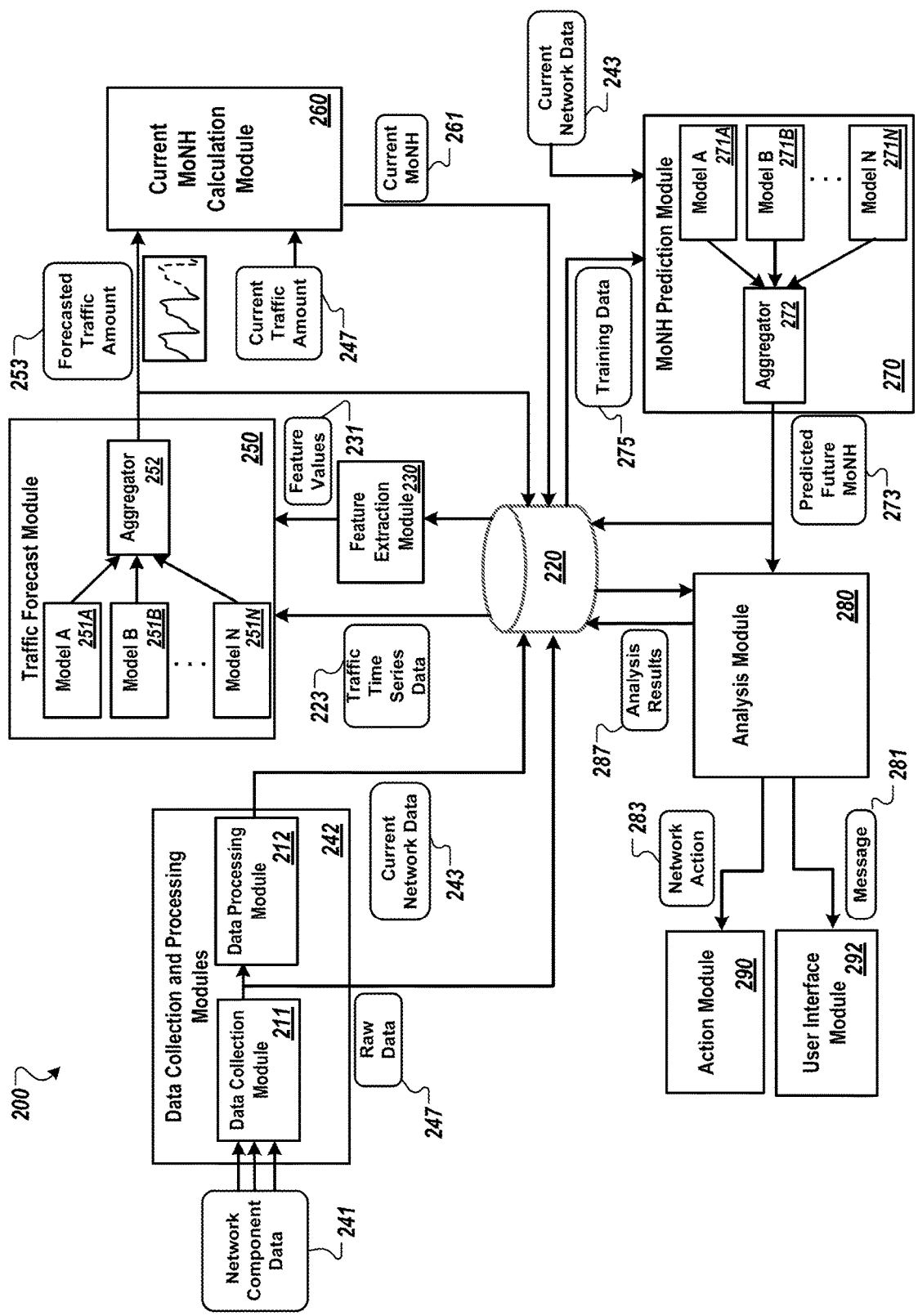
FIG. 2 is a diagram that illustrates an example of a system for monitoring a communication network using machine learning models.

The forecasted amount of network traffic for the specified time period can be predicted by the analytics module 144 based on historical network data 123, for instance, by using one or more machine learning models, as described in more detail in FIG. 2. For example, the analytics module 144 can include one or more linear models, random forest models, neural network models, support vector machines (SVMs), gradient-boosted descent techniques, or other models for determining the forecasted amount of network traffic. In some implementations, the output of one or more machine learning models may be aggregated to determine the forecasted amount of network traffic.

In the example of FIG. 1, based on the actual measured traffic and the forecasted amount of traffic for a current time period, the analytics module 144 determines a current MoNH 161 value of "0.8" for the network for the current time period.

Figure 4:
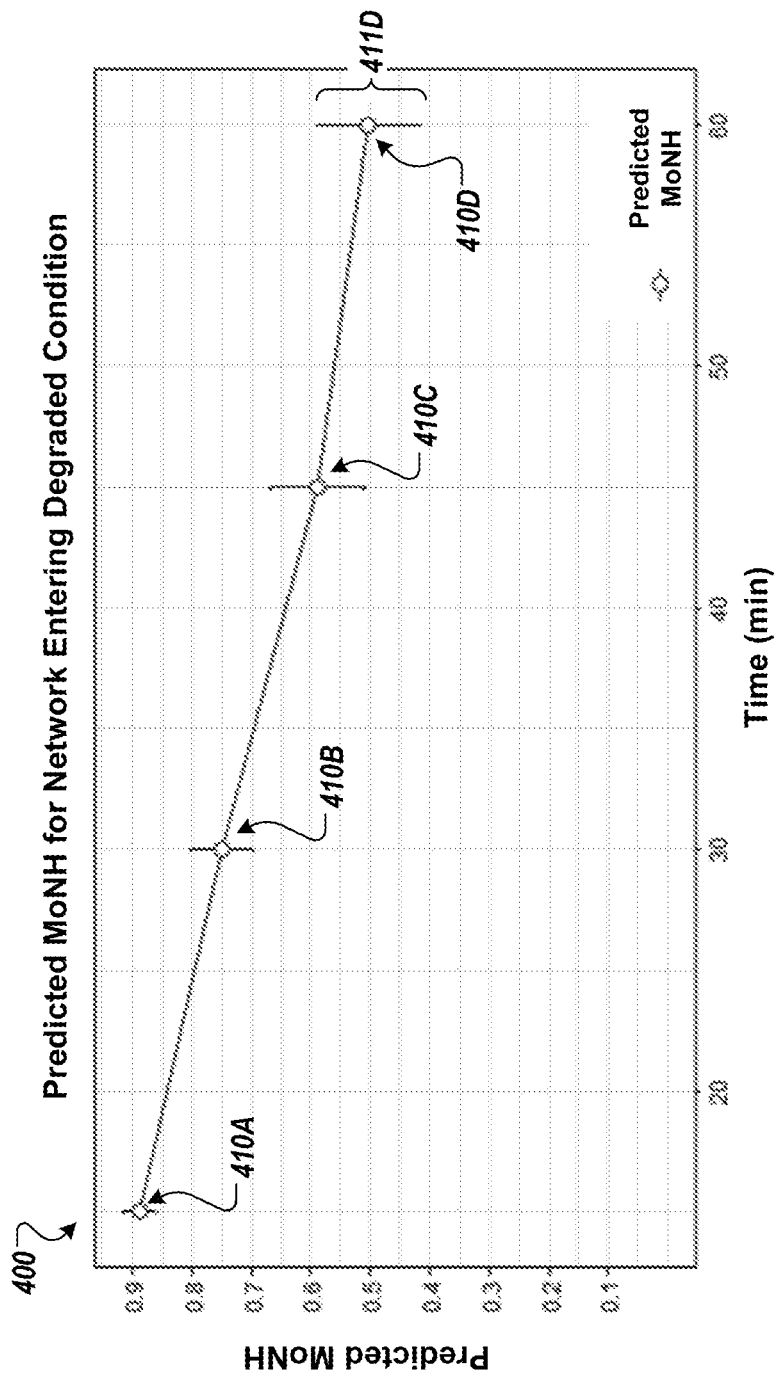
FIG. 4 is a chart that illustrates an example of future network health predicted by a system for monitoring a communication network.

The analytics module 144 can also output one or more predicted MoNH values 173 that estimate the condition and performance of the communication network for a future period of time. For example, the analytics module 144 may determine a series of predicted future MoNH values 173 for a series of times in the future (e.g., a predicted MoNH for 15 minutes, 30 minutes, 45 minutes from the current time, and so on). The analytics module 144 can output the predicted future MoNH values 173, as well as the future time period associated with a particular value 173. An example of a series of predicted future MoNH values 173 is shown in FIG. 4.

The predicted future MoNH 173 is predicted by the analytics module 144 based on the current network data 143. To determine the predicted future MoNH values 173, the analytics module 144 can include one or more trained machine learning models, described in more detail in FIG. 2. In some implementations, the analytics module 144 aggregates the output of more than one machine learning model to determine a predicted future MoNH value 173. For example, the analytics module 144 may use one or more feed-forward neural networks, linear regression models, SVMs, random forests, and XGBoost algorithms that each output a predicted future MoNH. The module 144 can then perform a weighted aggregation of the model outputs to determine the predicted future MoNH 173 value. The weights applied to the individual model outputs can be different for different networks, subsystems, or components, and may be determined, for instance, based on field tests or experimental results.

In some implementations, the analytics module 144 also estimates a certainty associated with each predicted future MoNH 173 and outputs the certainty along with the predicted future MoNH 173. The certainty can be, for example, a confidence interval, an error bar, or another measure of certainty associated with the predicted future MoNH 173.

In the example of FIG. 1, the analytics module 144 outputs the series of predicted future MoNH values 173 of "0.7," "0.65," and "0.5," for the time periods corresponding to 20 minutes, 40 minutes, and 60 minutes in the future, relative to the current time period. The decreasing predicted future MoNH values for time periods further from the current time period indicate that the network may be entering a degraded condition.

In stage (D), based on the current MoNH 161, the one or more predicted future MoNH values 173, the current network data 143, and/or the historical network data 123, the analytics module 144 determines one or more actions for the communication system 100 to perform to improve the capability and health of the network. For example, the analytics module 144 may generate a message 181 to provide for display to a client device 109. In some implementations, the message 181 indicates the current MoNH 161 and/or the one or more predicted future MoNH 173 values for the communication system 100. The message 181 can include a graphical representation of the current MoNH 161 and/or the predicted future MoNH values 173 (e.g., a time-series plot or chart of the current and predicted future MoNH values). In some implementations, the message 181 is an audio (e.g., synthesized speech) message.

The actions determined by the analytics module 144 can also include one or more network operations 183 that alter the operation of a particular subsystem, hardware component, or software component of the communication system 100. The network operations 183 can include, for example, sending an instruction to a component (e.g., to reset or configure a component), adjusting a setting of a component, or requesting additional data from a component.

In the example of FIG. 1, based on the predicted future MoNH values 173 that indicate that the network may be entering a degraded condition, the analytics module 144 determines the network action 183 to reconfigure a router of the network and generates the message 181 indicating that the network may be entering a degraded condition and that the system is reconfiguring the router to prevent further degradation.

In some implementations, the analytics module 144 is configured to provide an alert to the network operator that the MoNH is consistently in a degraded state. The system can generate MoNH values using the predictive model on an ongoing basis, and apply one or more thresholds to the generated values. For example, a minimum MoNH threshold can be set, so that values below the threshold represent a degraded state. When at least a predetermined number of MoNH values (representing a predetermined minimum duration of time) are below the threshold, the system can provide an alert to the network operator. For example, if MoNH is calculated every 5 minutes, and a series of 12 MoNH values are all below the threshold level, the system can alert the operator, since the network has been degraded for at least an hour.

In addition, a set of rules can be configured so that the analytics module 144 may cause the communication system 100 to automatically restart key traffic handling components if the MoNH is consistently below a minimum threshold. By design, the MoNH is a high-level quantification of network health. Nevertheless, it provides an objective indicator of overall network status, and when the MoNH is low, it can prompt the system to evaluate various rules and determine whether conditions are met for changing configuration parameters of the network. For example, different rules may specify actions to reset or reconfigure different types of components, and each rule can have one or more associated conditions for when the corresponding action is appropriate. A series of low MoNH values can prompt the system to assess the conditions of the rules and select actions to take to improve network health.

As another example, a feature vector indicating the current network state (optionally with the MoNH value) can be provided to an additional machine learning model configured to indicate actions to perform. The output of the additional machine learning model can indicate actions that, based on the input feature vector indicating the state of various components of the network, can be taken to restart or reconfigure the network to achieve greater health and traffic handling capacity.

In some implementations, the analytics module 144 only initiates actions to restart or reconfigure network components if the network administrator has not made other changes in an attempt to address the network problems. For example, the analytics module 144 may determine whether a user has changed any configuration settings or has restarted any components since the MoNH level degraded, and if so, avoid taking action to address the network condition. On the other hand, if no changes have been made recently, or at least if the component that the system determines should be adjusted has not been restarted or reconfigured recently, the analytics module 144 may determine to proceed with the corrective action determined.

In stage (E), if the analytics module 144 has generated a message 181, the computer system 140 provides the message 181 to the user 108. For example, the system 140 can display a visual message 181 in the graphical interface of the client device 109, where the client device 109 is a computing system (e.g., a work station, a tablet computing device, a smartphone, or another computing platform) configured to exchange data with the computer system 140. The system 140 may display a plot of the current MoNH 161 and the future predicted MoNH 173 on a screen of the client device 109. In some implementations, the message 181 is an audio message and the system 140 generates a synthesized speech signal for broadcast from a speaker of the client device 109. For example, the system 140 may generate a synthesized speech signal indicating the current MoNH 161.

In the example of FIG. 1, the computer system 140 provides to the client device 109 the message 181 indicating that the network may be entering a degraded condition and that the system is reconfiguring the router to prevent further degradation In stage (F), if the analytics module 144 has determined one or more network operations 183, the system 100 can perform the indicated operations. For example, the computer system 140 can send an instruction to the gateway 110a, 110b, or 110c to configure a component or perform a particular operation. In the example of FIG. 1, the computer system 140 performs the action 183 of reconfiguring the router, for example, by sending an instruction to the router via the network 105.

In some implementations, rather than automatically performing the network operation 183, the analytics module 144 generates a message 181 recommending that the operation 183 be performed. The computer system 140 provides the message 181 to the client device 109 (e.g., by providing a visual message for display on a graphical user interface of the client device 109, by providing a synthesized speech signal for broadcast from a speaker of the client device 109, etc.). The computer system 140 can also dynamically generate one or more interface elements for user interaction (e.g., a menu item or control selectable by the user 108). The system 140 can then wait for positive confirmation from the user 108 (e.g., via interaction with the one or more interface elements) before performing the operation 183.

As described above, the analytics module 144 can include one or more machine learning models for performing its various operations. For example, the module 144 can include machine learning modules for forecasting network traffic, for outputting the predicted future MoNH values 173, and for generating one or more messages 181 and/or network actions 182. To train the one or more machine learning models, the system 100 can use labeled network data for multiple points in time (e.g., multiple time periods) as training examples. For example, the system 100 can train the machine learning models using historical network data 123 that has been collected and labeled (e.g., labeled by a trained operator or a computer system) over a particular time period. The training examples used to train the machine learning models can include a subset of labeled historical network data 123, e.g., a subset selected by a user. In some cases, the system 100 may use as training data historical network data 123 collected from the network over a period of days, weeks, or months.

In some implementations, the training examples used to train the machine learning models can include labeled data obtained from other communication networks, e.g., in addition to or instead of the data obtained from the system 100. For example, the machine learning models can be trained using labeled data obtained from a similar, but separate, communication network. In some implementations, the system 100 can train one or more machine learning models using labeled data from multiple networks so that the models can be trained on a variety of operational scenarios in a relatively short amount of time (e.g., if data from different networks describe different operational scenarios).

In some implementations, the system 100 can periodically retrain one or more of the machine learning models of the analytics module 144, e.g., using updated labeled network data. For example, the system 100 can retrain one or more of the machine learning models to train the models to respond to operational scenarios that were not included in a previous set of training data. In some implementations, the system 100 is configured to automatically retrain one or more machine learning models. For example, at a specified time interval (e.g., once every three months), the system 100 can be configured to retrieve historical network data 123 collected since the last time interval from the storage device 120 and retrain one or more models. The system 100 can compare the performance of the retrained models to the performance of the models prior to retraining. If the performance of the retrained models is better than the performance of the models prior to retraining, the system 100 can use the retrained models.

The training process alters the parameters of the machine learning model so that the model learns internal function(s) or mapping(s) between an input set of data and a model output. For example, training a traffic forecast machine learning model may alter parameters such that the model learns a mapping between an input that includes historical network traffic (e.g., included in labeled historical network data 123) and an output that includes a forecast network traffic.

The process described by stages (A) through (F) can be repeated at regular intervals (e.g., every 10 minutes) by the system 100 to monitor the condition of the communication network. By repeatedly determining the MoNH 161 and predicting the future MoNH 173, the system can identify situations where the health or condition of the network may be deteriorating and recommend or perform corrective actions to prevent further network degradation or failure.

FIG. 2 is a diagram that illustrates an example of a system 200 for monitoring a communication network using machine learning models. Some or all of the system 200 can be implemented, for example, as part of the computer system 140 of system 100. The system 200 includes one or more machine learning modules that use machine learning techniques for monitoring a communication network. For example, the system 200 can include a traffic forecast machine learning module 250 for determining a forecasted amount of network traffic 253, a MoNH prediction machine learning module 270 for determining one or more predicted future MoNH 273 values, and an analysis machine learning module 280 for generating a message 281 or recommended network action 283. As an overview, the system 200 has two main machine learning processing elements, discussed below.

First, the traffic forecast module 250 estimates a forecasted traffic for the communication network using traffic forecasting models 251A-251N. In some implementations, the training of the models 251A-251N is based on time series data indicating historical traffic amounts for the communication network, independent of configuration data and status information for the network. Through training, these models 251A-251N can be configured to generate the traffic forecast for a particular time in the future based on input features indicating the particular time for which a forecast is desired, and without any other information about the network being input to the 251A-251N. The traffic forecasts created by the traffic forecast module 250 are used to calculate MoNH values, which are stored in the data storage 220.

Second, the calculated MoNH values in data storage 220 are used to train MoNH prediction models 271A-271N. The system 200 monitors the status of various components of the communication network and stores data indicating the information for various times. The status information, with the MoNH values, represent training data 275 that is used to train the models 271A-271N to be able receive network status data for one time period as input and generate a predicted MoNH value for a future time period as output. For example, the models 271A-271N can be trained with target outputs that represent MoNH values for times each at a consistent time offset from the time of the network status data provided as input. In this way, the time associated with the input network status data consistently lags the time associated with the target output values. Then, after training of the models 271A-271N, providing current network status data 243 can prompt the models 271A-271N to produce an estimate of the MoNH of the network for a time in the future.

In further detail, the system 200 includes one or more data collection and processing modules 242 that receive status and statistic information from one or more components of the communication system and generate the current network data 243 used for monitoring the communication system. The data collection and processing modules 242 include a data collection module 211 that can obtain network component data 241 from the subsystems and components of the satellite communication system. The network component data 241 can include various information for each of the subsystems, components, and their respective software instances. The data collection module 211 can obtain the information periodically based on a specified time period, e.g., one minute, five minutes, one hour, or another appropriate time period.

The data collection module 211 can provide raw data 247 received from the component(s) of the communication system to the data processing module 212 and to a data storage 220 for storage in a database. The raw data 247 stored by the data storage 220 can include some or all of the network component data 241.

The data storage 220 can include, for example, a NAS device, or other memory system which is accessible by a computer system of the communication system. The data storage 220 stores various data related to or generated by the communications network and provides the data to various modules of the system 200, as indicated throughout the description. Some or all of the data stored by the data storage 220 can be provided to a human operator, for example, through the user interface module 292. The data, or a subset of the data, stored by the data storage 220 can also be used to train or retrain one or more machine learning models of system 200, as described below.

The data processing module 212 can processes the raw data 247 for input to one or more machine learning models used for monitoring the communication system. This processing can include converting the information to an appropriate format, aggregating the information, and/or normalizing the information. In some cases, some information (e.g., status and alarm data) can be in the form of text. This text data can be converted to numerical data using a conversion function.

The data processing module 212 can aggregate a portion of the information based on component type, location in the communication system, and/or the type of information. For example, each piece of information for multiple instances of the same type of component and within the same part of the network (e.g., part of the same channel, beam, or gateway) can be aggregated using averaging, convex summation, of another appropriate aggregation technique. The data processing module 212 can also normalize the information and any aggregated information to a particular range, e.g., from zero to one inclusive.

The data processing module 212 provides the current network data 243 to the data storage 220. As network data is generated, it is stored as historical network data. The data processing module 212 may also provide the current network data 243, or some of the current network data 243 (e.g., the current traffic 247) to one or more other modules of the system 200, as indicated later in the description of FIG. 2.

The system 200 uses records of network traffic over time to train models 251A-251N of the traffic forecast module 250. This information can be provides as network traffic time-series data 223. The time series data 223 can indicate measured amounts of traffic handled by the communication system, or by one or more subsystems or components of the communication system, for a series of previous time periods (e.g., an amount of traffic in Mbps determined at an interval, such as every minute, every 5 minutes, every hour, etc.).

The system also uses a feature extraction module 230 to determine feature values 231. The feature values 231 represent a context or environment at a particular time. During training, the models 251A-251N are trained with training examples that represent conditions at different times. For each training example, a set of feature values 231 representing a particular time is the input to the model 251A-251N, and the measured traffic for the particular time (as indicated by the time series data 223) is the target output that the model 251A-251N is trained to predict. Through training using a significant length of traffic time series data 223, the models 251A-251N can learn to predict the expected traffic for a given time, e.g., to learn the patterns and trends for network traffic and indicate the likely level of traffic according to the patterns and trends observed in the time series data 223.

In some implementations, the feature values 231 represent a time. For example, the feature values 231 can include time decomposition data, in which a time stamp is decomposed to generate a value for each of multiple different temporal fields or features with different temporal resolution (e.g., year, half-year, quarter, month, day of the month, day of the week, hour, minute, seconds, seconds since last observation, etc.). For example, the feature extraction module 230 can decompose the single time stamp "Jun. 28, 2018 9:19:08 PM" to generate the feature values "2018," "first half," "second quarter," "June," "28," "Thursday," "2100 hours," "19 minutes," "8 seconds," and "312 seconds since last observation," each of which indicate a different aspect of the time in the time stamp. These features can be expressed in binary form, e.g., seven features respectively indicating whether the timestamp represents the different days of the week, four features respectively indicating whether the timestamp is in the first quarter, second quarter, third quarter of the year, 24 features respectively indicating whether the timestamp falls in the different hours of a day, and so on. The individual values of the time decomposition data can be used as predictors (e.g., independent variables) in the traffic forecast machine learning module 250 to estimate the forecasted traffic 253. By providing time decomposition data to the traffic forecast module 250 as predictors, the machine learning module can better identify and account for cyclical variation in network traffic associated with different temporal resolutions (e.g. monthly variations, daily variations, seasonal variations, etc.)

The feature extraction module 230 may also generate other feature values 231, for example, data identifying a particular component corresponding to the traffic data, or any other feature values 231 used by the traffic forecast module 250 to generate the forecasted traffic 253. For example, if the models 251A-251N are trained using data of multiple networks or multiple types of networks, an identifier for the network or network type of interest can be provided as an input feature value 231. In some implementations, such as when the models 251A-251N are trained for a specific network or network component, the feature values 231 represent only time information. In this manner, the models 251A-251N can be trained to output a traffic forecast based on only an indication of a time.

After the models 251a-251N have been trained, the models 251A-251N can be used to generate predicted or forecasted traffic amounts 253. Based on the input feature values 231 for a current time period, the traffic forecast module 250 generates a forecasted traffic 253 for the current time period. The forecasted traffic 253 predicts the level of network traffic that is expected to be handled by the communication system during the current time period if the system is in a proper operating condition (e.g., a MoNH of "1"), according to the trends and patterns of traffic shown by the traffic time series data 223 used in training. In some implementations, the traffic forecast module 250 additionally or alternatively generates a forecasted traffic 253 for a particular subsystem, subgroup, or component of the communication system (e.g., the amount of forecasted traffic 253 to be handled by a particular satellite gateway).

Figure 3:
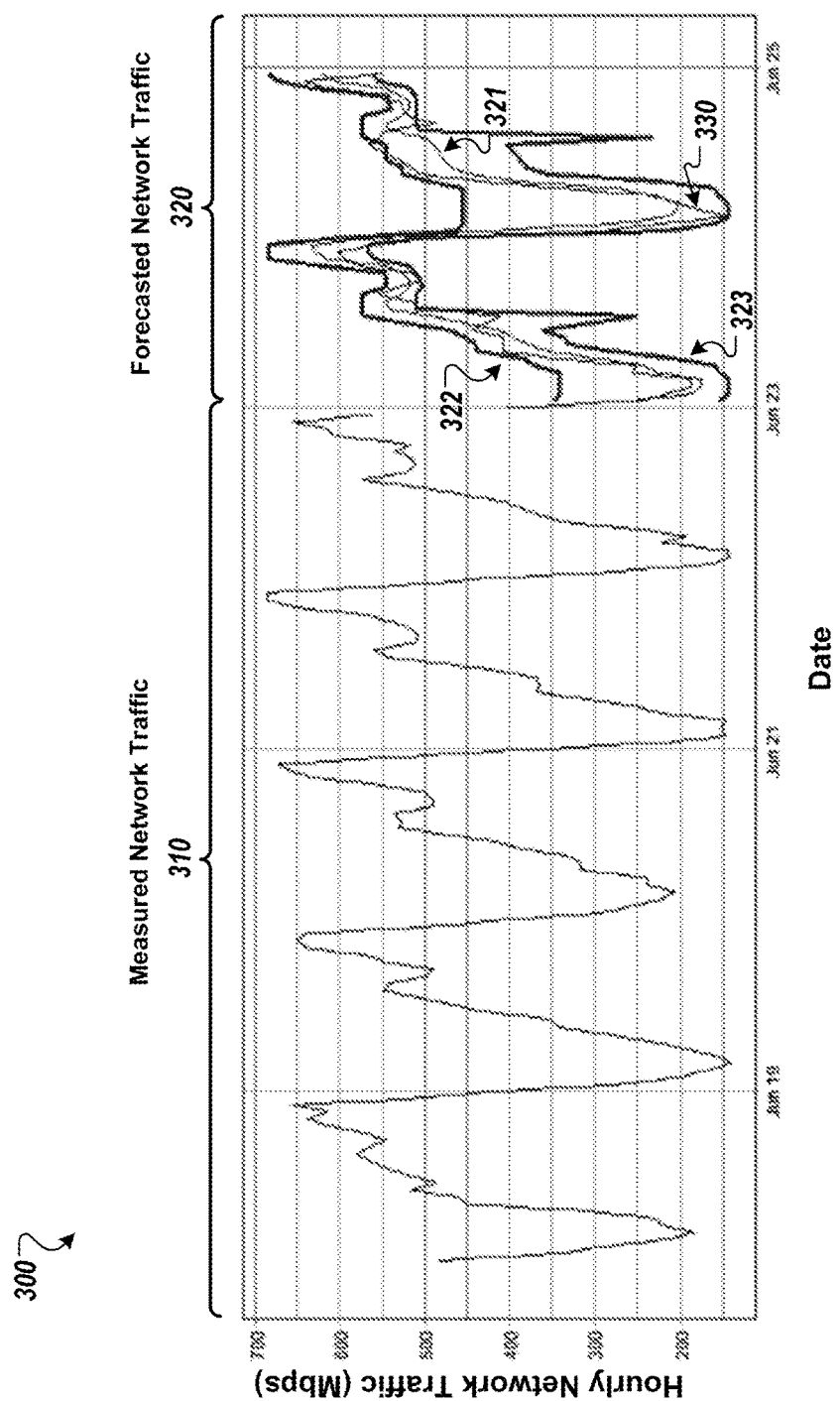
FIG. 3 is a chart that illustrates an example of a forecasted network traffic for a satellite communication network.

As noted above, the traffic forecast module 250 can predict the forecasted network traffic 253 for the communication system based on historical traffic, e.g., on data indicating the historical usage of the system over previous time periods. As a result, the forecasted traffic 253 can take into account historical usage patterns that may vary cyclically with week, day, month, etc. As a result, the traffic forecast module 250 can predict the forecasted network traffic 253 for a future time period without using network status data 243 (e.g., system or component status or statistic information for the current time period). An example of forecasted traffic 253 is illustrated in FIG. 3.

To generate the forecasted traffic 253, the traffic forecast module 250 may use one or more of the machine learning models 251A-251N. Each model 251A-251N may generate an individual forecasted traffic output. The individual outputs of the models are then combined by an aggregator 252 (e.g., by performing a weighted sum of the model outputs) to generate the forecasted traffic 253 output by the traffic forecast module 250.

The machine learning models 251A-251N can include any of various machine learning models. In some implementations, the models 251A-251N can each implement a different type of prediction model, e.g., using a different machine learning algorithm or a different structure or training technique. Examples include neural networks, decision trees, support vector machines, regression models, and so on.

The models 251A-251N can include one or more linear models, in which the forecasted network traffic is predicted as a linear function of the time decomposition data (e.g., of the various temporal fields). The linear models can be implemented as a set of linear equations in matrix format, where the coefficient for each temporal field represents a weight for that field. Using machine learning or other methods, the traffic forecast module 250 can determine an optimal value for the weights to generate a forecasted traffic output of the model.

The models 251A-251N can also include one or more random forest regressor models, in which many multiple subsets of the feature values 231 are modeled individually as decision trees, with each decision tree generating a forecasted traffic output. The final forecasted traffic output for the model is determined by a weighed combination of the individual tree outputs. The number of decision trees generated is a variable that could be determined by doing a grid search when the model is first executed.

The models 251A-251N can also include one or more neural network models. For example, the models 251A-251N can include a multilayer feed forward neural network, which includes one or more hidden layers. The time decomposition data temporal fields can be used as predictors that are provided to nodes of the input layer of the network. The neural network weights the inputs and feeds the signals forward to one or more nodes of the next layer, e.g., a hidden layer, which similarly weights and feeds the signals forward to one or more nodes of the next layer. The feed forward propagation continues until the signals reach an output layer, at which point the signals of the nodes in the output layer are combined to generate the predicted traffic output. The number of nodes in each layer is configurable, as is the number of layers. The optimal configuration can be determined by doing a grid search to minimize any cross-validation error in the predicted traffic value. Each hidden layer node can also be associated with a bias value, which can be set prior to execution.

The forecasted traffic outputs of each of the machine learning models 251A-251N are combined by the aggregator 252, which generates a weighted sum (e.g., a convex combination) to determine the forecasted traffic 253 output by the traffic forecast module 250. The weights applied to the individual models by the aggregator can be determined by any of various methods. In some implementations, the weights applied to the model outputs can be determined by a machine learning technique. For example, the parameters used by the aggregator 252 may be trained jointly with or after training of the individual models 251A-251N.

The machine learning models 251A-251N of the traffic forecast module 250 are trained using labeled training data, e.g., traffic values from the time series data 223 labelled with corresponding sets of feature values 231 representing the times that the traffic values were measured. In some implementations, the traffic forecast module 250 may estimate a historical network-level traffic for the system by aggregating historical traffic data for a subsystem, subgroup, or component of the system (e.g., estimate the network-level traffic for a multi-beam system using historical traffic data for data about individual beams) and use the estimated historical network traffic as training data.

The module 250 can provide the forecasted traffic 253 to the data storage 220 for later retrieval.

The traffic forecast module 250 also provides the forecasted traffic 253 to the current MoNH estimation module 260, which outputs one or more current MoNH values 261 based on the forecasted traffic 253 and the actual measured current traffic 247. The current traffic 247 is the measured traffic for the current time period and can be determined, for example, from the current network data 243, which may be provided to the current MoNH estimation module 260 by the data collection and processing modules 242. The current MoNH estimation module 260 can output a MoNH 261 for the communication system, as a whole (e.g., a system-level MoNH 261), as well as MoNH values 261 for particular subsystems, subgroups, or components of the communication system.

In some implementations, the current MoNH estimation module 260 determines a MoNH 261 that is the ratio of the measured current traffic 247 to the forecasted traffic 253 for the current time period, as described in FIG. 1.

The current MoNH values 261 provide a quantitative measure of the operating condition and performance (e.g., "health") of the communication system or of a particular subsystem, subgroup, or component of the communication system. The system 200 can use the output MoNH 261 to evaluate the current operating condition of the network and to recommend or perform various actions to adjust the operation of the network. The current MoNH estimation module 260 can also provide the output MoNH values 261 to the data storage 220 for later retrieval.

After determining the current network condition and health by outputting the current MoNH 261, the system 200 can further process the available data to generate one or more predictions of a future condition of the network. For example, the current MoNH estimation module 260 can provide the output current MoNH 261 to a MoNH prediction machine learning module 270. The MoNH prediction module 270 can also receive the current network data 243, e.g., from the data collection and processing modules 242 or from the data storage 220, as well as historical network data from the data storage 220. The historical network data received by the MoNH prediction module 270 can include current network data that was collected by the system 200 at a previous time period, as well as other data related to the network that was generated by the system 200 during a previous time period. For example, the historical network data can include a forecasted traffic 253 for the network generated during a previous time period, or a current MoNH 261 generated during a previous time period.

Based on the current network data 243 (e.g., an input vector representing current network component status), the MoNH prediction module 270 generates one or more predicted future MoNH values 273 that estimate the condition of the communication network at one or more future time periods (e.g., the condition of the network for a period 15 minutes in the future, or 4 hours in the future, or one day in the future). In some implementations, the module 270 generates predicted future MoNH values 173 for multiple time periods separated by a predetermined time interval (e.g., predictions for 15, 30, and 45 minutes in the future). An example of multiple predicted future MoNH values 273 separated by a 15-minute predetermined time interval is illustrated in FIG. 4.

To generate the predicted future MoNH values 273, the MoNH prediction module 270 can use one or more machine learning models 271A-271N. In some implementations, the models 271A-271N use, as inputs, status and statistic information for various subsystems, components, software instantiations, and elements of the communication system (e.g., status and statistic information included in the current network data 243 and potentially the historical network data) to generate a predicted future MoNH value. For example, the models 271A-271N may use status and statistic information for one or more of the components and software instantiations within a particular subsystem to generate the predicted future MoNH values 273 for that subsystem.

In some implementations, the models 271A-271N use a predetermined number of input feature values, e.g., ten to 100 in some cases, as input. In some implementations, the modules 271A-271N may use more than 100 status and statistic values as input and aggregate several status and statistic information predictor inputs to reduce the dimensionality of the inputs to the models 271A-271N. The module 270 can aggregate the inputs by any of various techniques, including dimensionality reduction (e.g., using another machine learning model to determine the "n" predictors that have the greatest impact on the output and using only those "n" predictors) and principal component analysis (e.g., mapping the many predictor inputs to a lower dimensional space).

In some implementations, the module 270 may use a feed-forward neural network to reduce the dimensionality of the status and statistic inputs provided to the machine learning models 271A-271N. For example, the module 270 may provide all of the inputs to a feed-forward neural network with "k" hidden layers, where, for at least one layer, the number of nodes in a subsequent hidden layer is less than the number of nodes in the previous hidden layer. The module may then take the output of the nodes of a particular layer of the neural network (e.g., the "jth" layer), which has fewer nodes than number of inputs to the neural network, as the input to the models 271A-271N. In some implementations, one or more parameters of the neural network can be adjusted to tune the machine learning model inputs that are generated by the neural network. For example, a learning rate of the network, or a bias applied to one or more nodes of the network can be adjusted to modify the generated machine learning model inputs.

The models 271A-271N can include any of various machine learning models and techniques. For example the models 271A-271N can include one or more of a linear regression model, a SVM, a random forest model, an XGBoost tree, a neural network, or another machine learning technique or model. In some implementations, the models 271A-271N each implement a different type of model.

For a MoNH prediction module 270 that includes multiple models, the individual outputs of the models 271A-271N are then combined by the aggregator 272, which performs a weighted sum of the individual outputs to generate the predicted future MoNH values 273 output by the module 270. As in the traffic forecast module 250, the weights applied to the individual models 271A-271N of the MoNH prediction module 270 can be determined by any of various methods, including determination by machine learning techniques, conventional optimization techniques, and/or experimentation. The predicted future MoNH values 273 can be provided to the data storage 220 for later retrieval. The module 270 may also output one or more time periods associated with the predicted future MoNH values 273, as well as one or more certainties associated with the predicted future MoNH values 273 (e.g., a time period and a certainty for each predicted future MoNH value 273).

The machine learning models 271A-271N of the MoNH prediction module 270 are trained using labeled training data. Each training example can include (i) a vector of network status information describing the state of network component at a particular time and (ii) a corresponding MoNH value 261 for a future time that represents the particular time plus a predetermined time offset. The vector of network status information is the input to the models 271A-271N, and the MoNH values are target outputs that the models 271A-271N are trained to predict. The same predetermined time offset can be consistent across the set of training data, so that during training the models 271A-271N learn to predict the MoNH value 261 for a time at the predetermined time offset for whatever time is represented by the input vector. For example, the offset may be one hour, so that the models 271A-271N predict the MoNH value for a time one hour in the future after the network state represented by the input to the models.

Unlike the models 251A-251N, the models 271A-271N generally do not receive input indicating a time reference. The models 251A-251N can be configured to predict traffic amounts based on a time, without information about the state of network components. On the other hand, the models 271A-271N can be configured to predict future MoNH values based on input that indicates the current state of network components, without the input specifying a time.

Training of the models 271A-271N can use historical network data that includes MoNH values 261 determined during previous time periods as training data. The historical MoNH values 261 can be used to label historical network status data using a predetermined time offset as discussed above. As a result, each training example includes network state information for a particular time, and the MoNH value used as a label is what was generated for future time at the predetermined time offset in the future with respect to the time the particular time. The network state or status information, with the labeled MoNH values, represent training data 275 that is used to train the models 271A-271N to be able receive network status data for one time period as input and generate a predicted MoNH value for a future time period as output. For example, the models 271A-271N can be trained with the MoNH value labels as target output, and with network status data provided as input. In this way, the time associated with the input network status data consistently lags the time associated with the target output values. Then, after training of the models 271A-271N, providing current network status data 243 can prompt the models 271A-271N to produce an estimate of the MoNH of the network for a time in the future.

If desired, multiple sets of models 271A-271N can be generated for different time offsets. For example, one set of models may be trained to predict the MoNH one hour in the future, another set of models may be trained to predict the MoNH four hours in the future, yet another set of models may be trained to predict the MoNH one day in the future, and so on.

The predicted future MoNH values 273 generated by the MoNH prediction module 270 are provided to an analysis module 280, which can analyze the predicted future MoNH values 273 and other network data to recommend one or more network operations 283 for the communication system. For example, based on analyzing the predicted future MoNH values 273, the engine 280 may determine that the communication system is entering a degraded condition (e.g., the values 273 indicate a steady decrease of predicted future MoNH over time) and the module 280 may recommend that a corrective network operation 283 be performed (e.g., resetting a particular component, adjusting a system parameter, measuring an output of a network device or component). The analysis module 280 can provide the recommended network operation 283 to an action module 290, which can then cause the operation 283 to be performed (e.g., by sending an instruction to a particular component or system element).

In some implementations, the analysis module 280 can generate a message 281, which it provides to a user interface module 292. The message 281 can include, for example, data indicating the determined current MoNH 261, the one or more predicted future MoNH values 273, and/or the recommended network operation 283. In some implementations, the message 281 may include a request for permission to perform the recommended network operation 283. The user interface module 281 can then provide, to a device of a user, the message 281, e.g., at a graphical user interface, by way of e-mail or text message, or using a spoken language interface.

In some implementations, the module 280 receives and uses the historical network data, the current network data 243, the current MoNH 261, and/or other data obtained from the data storage 220, in addition to the predicted future MoNH values 274, to determine the network operation 283 and/or the message 281.

The analysis module 280 can provide analysis results 287 to the data storage 220, where the analysis results 287 include some or all of the message 281, the network action 283, a determined current or future condition of the communication network, a problem of the communication network, or other data generated by the analyses of the module 280.

The analysis module 280 can determine the network operation 283 and/or the message 281 by any of various methods. For instance, the module 280 can include a rules-based engine. In some implementations, the module 280 can additionally or alternatively use one or more machine learning models to determine the network operation 283, the message 281, or an analysis result 287. The machine learning models of the module 280 can be any of the various types described previously for the models 251A-251N of the traffic forecast module 250 or the models 271A-271N of the MoNH prediction module 270 (e.g., linear models, random forest models, feed-forward or other neural network models, SVMs, gradient-boosted descent techniques, and so on). In some implementations, the analysis module 280 may use multiple machine learning models and aggregate the individual outputs of the multiple models to generate the message 281, the network action 283, or the analysis results 287.

The machine learning models of the analysis module 280 can be trained using labeled training data, e.g., data received from the data storage 220. For example, the system may train one or more machine learning models of the module 280 using labeled historical network data that describes different conditions or operational scenarios of the communication system. The labeled historical network data can include data indicating a condition or operational scenario of the system, as well as data indicating a status, statistic, performance metric, or other property of the system or a component of the system when it was in the indicated condition or operational scenario. The labeled historical network data can also include one or more actions performed by the system in response to the indicated condition or scenario. The actions can include actions determined by a human operator in response to the indicated network condition or scenario. The actions can also include a message 281, a network action 283, or an analysis result 287 for the system determined by the analysis module 280 during a previous time period. Using the labeled training data, the system 200 can train one or more machine learning models of the analysis module 280 to output a message 281, network action 283, or other analysis result 287.

FIG. 3 is a chart 300 that illustrates an example of a forecasted network traffic 320 for a satellite communication network. The forecasted network traffic 320 could be generated, for example, by the traffic forecast module 250 of system 200.

The chart 300 depicts the hourly network traffic of a satellite communication system (in Mbps) over the course of seven days, where the traffic for the first five days (E.g., June 18-June 22) is measured network traffic data 310 (e.g., historical network traffic) and the traffic for the subsequent two days (e.g., June 23-June 24) is forecasted network traffic 320, e.g., the predicted network traffic as determined by a traffic forecast module based on the historical measured network traffic data 310. The historical measured network traffic data 310 exhibits a cyclic variation that repeats on a daily basis, as may be typical in satellite communication systems. While the chart 300 depicts the traffic handled by the overall network, the illustration can similarly describe the traffic handled by a subsystem, subgroup, or component of the network.

Based on the measured network traffic data 310, the system generates the forecasted network traffic 320, which is a time-series prediction of the expected network traffic during a particular time period based on the previously-measured network traffic data 310. The forecasted network traffic 320 can be generated using any of various methods, e.g., by the traffic forecast module 250 of FIG. 2, including using one or more machine learning techniques, as described above.

In some implementations, the forecasted network traffic 320 generated by the system includes a predicted traffic time series 321, as well as data indicating a particular confidence interval for the predicted traffic series 321 (e.g., the time series 322 and 323, which indicate the upper and lower bounds of the 95% confidence interval, respectively). The system can use the predicted traffic time series 321, or select another time series (e.g., a series within the confidence interval time series 322 and 323) to use as the forecasted traffic used to determine the current MoNH. For comparison, the chart 300 also displays the actual network traffic 330 measured during the final two days of the time series, which is in good agreement with the predicted traffic time series 321 generated by the traffic forecast module.

FIG. 4 is a chart 400 that illustrates an example of future network health predicted by a system for monitoring a communication network. The chart 400 includes a series of predicted future MoNH values 410A through 410D generated by the system, e.g., by the MoNH prediction module 270, for four time periods at consecutive 15 minute intervals in the future, relative to a current time period. The monotonic decrease in predicted MoNH for times further in the future indicates that the communication network may be entering a degraded condition.

For each predicted future MoNH value 410A through 410D, the system can generate an associated confidence interval, e.g. the confidence interval 411D, which indicates a certainty of the predicted future MoNH for that time period. In general, the confidence intervals will increase in extent as the time period extends further into the future, reflecting the greater uncertainty in predicting system condition for times further from the current time period.

Figure 5:
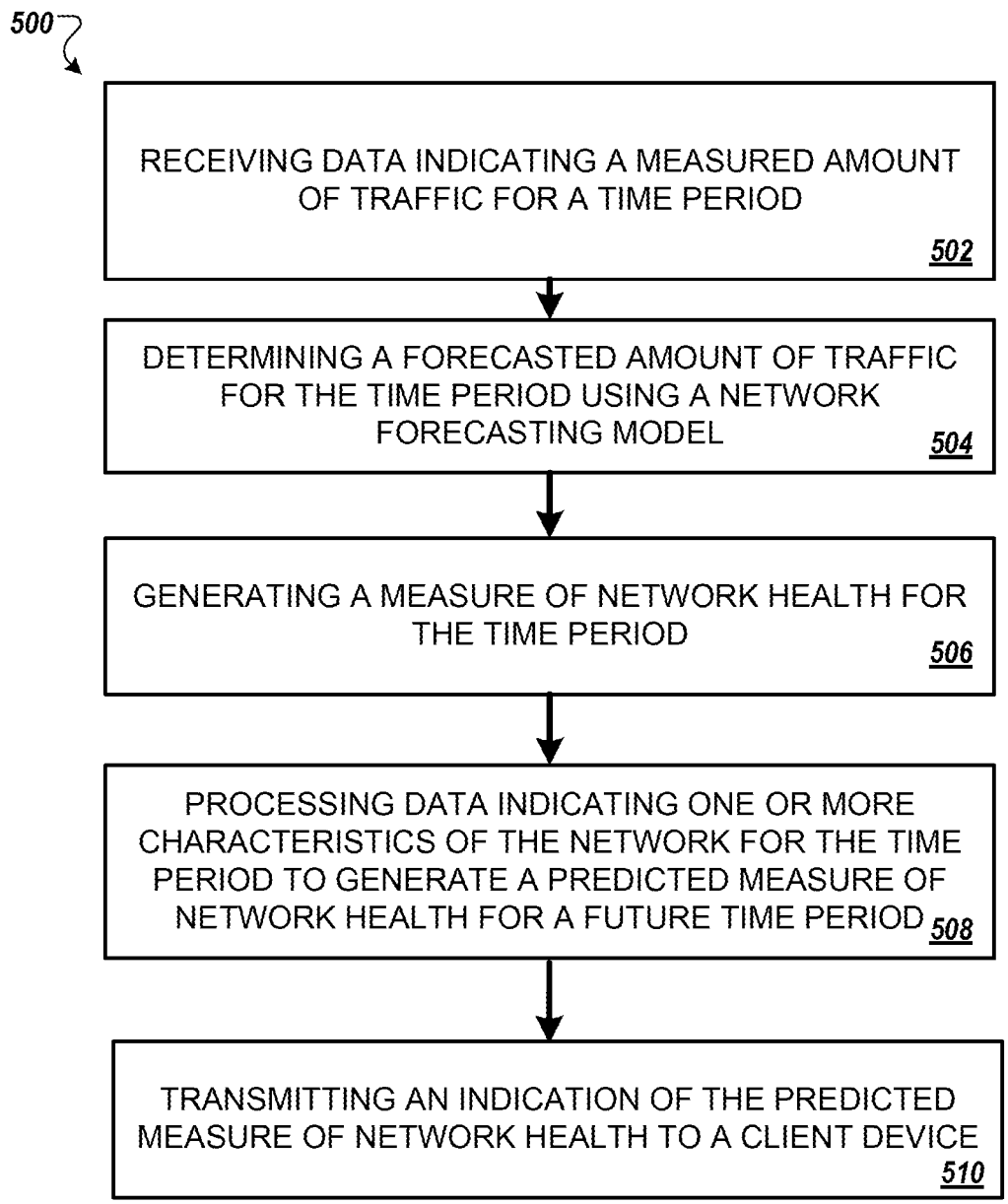
FIG. 5 is a flow diagram that illustrates an example of a method for monitoring a communication network.

FIG. 5 is a flow diagram that illustrates an example of a method 500 for monitoring a communication network. The method 500 can be performed by one or more computing devices, for example, a computer system of a satellite communication network such as the computer system 140 of FIG. 1. Briefly, the method includes receiving data indicating a measured amount of traffic for a communication network for a time period (502); determining a forecasted amount of traffic for the communication network for the time period using one or more network forecasting models (504); generating a measure of network health for the time period (506); processing data indicating one or more characteristics of the communication network for the time period to generate a predicted measure of network health for a future time period (508); and transmitting an indication of the predicted measure of network health to a client device (510).

In more detail, the method includes receiving, by the one or more computing devices, data indicating a measured amount of traffic for a communication network for a time period (502). The communication network can include a satellite communication network, where the data indicates a measured amount of traffic handled by the satellite communication system during a particular time period. In some implementations, the communication network can be a subsystem of a larger network, for example, a satellite gateway, a beam subsystem, or another subgroup of a satellite communication network or other communication network. The particular time period can be, for example, a time period that includes a current time.

The data indicating the measured amount of traffic can be, for example, a measured data rate (e.g., Mbps) handled by the communication network or handled by a subsystem, subgroup, or other component of the communication network. In some implementations, the data indicating the measured amount of traffic is collected at periodic time intervals and stored by the computing devices, e.g., in a NAS device or other memory storage device accessible by the computing devices.

The method also includes determining a forecasted amount of traffic for the time period using one or more network traffic forecasting models (504). The one or more network traffic forecasting models can be configured to generate the forecasted amount of traffic based on data indicating one or more previous amounts of traffic for the communication network, where each of the previous amounts of traffic indicates a measured amount of traffic for the communication network during a previous time period. For example, the network traffic forecasting models may forecast traffic based on time series data indicating previously-measured network traffic for the communication network over a specified time interval prior to the current time period (e.g., time series data indicating the measured network traffic over the previous five days or over the previous 48 hours).

In some implementations, the network traffic forecasting models include one or more machine learning models that are trained to generate the forecasted amount of traffic using training data that indicates one or more previous amounts of traffic for the communication network. The previous amounts of traffic used to train the network traffic forecasting models can be different amounts of traffic than those used by the models to determine the forecasted amount of traffic. For example, the models may use previous traffic measured weeks or months before the current time period for training, while the models may use previous traffic measured days or hours before the current time period to determine the forecast amount of traffic. In some implementations, the machine learning models are trained on network traffic data measured for a network other than the communication network for which the models forecast traffic. In some implementations, the outputs of multiple machine learning models are aggregated to generate the forecasted amount of traffic.

Based on the measured amount of traffic and the forecasted amount of traffic, the computing devices can generate a measure of network health for the time period (506). The measure of network health can indicate a health, an operability, a condition, or a performance of the communication network. The measure of network health can indicate the health of the communication network, as a whole. The measure of network health can also indicate the health of a subsystem, subgroup, or component of the communication network. For example, for a communication network that is a satellite communication network, the measure of network health can indicate the health of a particular satellite gateway, beam, or other subsystem.

In some implementations, the measure of network health is generated based on a ratio of the measured amount of traffic and the forecasted amount of traffic. In some implementations, the measure of network health is a value in the range of zero to one, inclusive.

The method also includes processing, by the one or more computing devices, data indicating one or more characteristics of the communication network for the time period to generate a predicted measure of network health for a future time period (508). The processed data indicating characteristics of the communication network can include status and statistic information from various subsystems, hardware components, and software components of the communication network. For example, the processed data can include status data (e.g., active, inactive, error state, etc.), metrics and statistics (e.g., current data transmission speeds, peak data transmission speeds, the number of items in a queue, number of dropped packets, average network traffic, peak network traffic, etc.), error and alarm data, error rates, and/or other appropriate information about the status or operation of the communication network or a subsystem or component of the component.

The predicted measure of network health can be generated using one or more network health prediction models that have been trained using machine learning based on training data indicating a measure of network health for a previous time period and the one or more characteristics of the communication network for the previous time period. In some implementations, the network health prediction models may be trained using training data from another network (e.g., from a network other than the network for which the predictions are generated).

The computing devices can generate one or more predicted measures of network health based on processing the data. For example, the computing devices can generate a series of predicted measures of network health, where each predicted measure of network health of the series is associated with a different future time period (e.g., 20 minutes after the current time period, 40 minutes after the current time period, 60 minutes after the current time period, and so on). In some implementations, the outputs of multiple network health prediction models are aggregated to generate the one or more predicted measures of network health.

In some implementations, the network health prediction models also generate a certainty for each generated predicted measure of network health, where the certainty provides an indication of the confidence of the prediction. The certainty can be, for example, a confidence interval, an error bar, a confidence estimate, or another measure of certainty or uncertainty.

The computing devices can transmit an indication of the one or more predicted measures of network health for future time periods to a client device for display in a user interface (510). The client device can be, for example, a computer system, a work station, a mobile computer (e.g., a smart phone, a tablet computing device, a laptop computer, a smart watch), or another computing device. In some implementations, the computing device transmit additional information along with the predicted measures of network health. For example, the computing device can transmit the certainties for the predicted measures of network health or a determined current measure of network health. In some implementations, the computing device transmits the indication of the one or more measures of network health for future time periods for audio broadcast by the client device, e.g., as a synthesized speech signal.

In some implementations, the computing devices can also transmit to the client device data indicating a message for display in the user interface. For example, the data can indicate a text message that provides a recommendation for a network action as described below. The data can also indicate a graphical display of data, for example, a chart of predicted measures of network health for future time periods.

In some implementations, the method also includes analyzing, by the computing devices, the one or more predicted measure of network health for future time periods and, based on the analysis, determining an action for an electronic device of the communication network. For example, the computing devices can analyze the predicted measure of network health for the future time period to determine that the network is entering a degraded condition. The computing devices can then determine an action that mitigates or reverses the degradation.

The action can be, for example, adjusting a setting of the electronic device, changing a configuration of the electronic device, or measuring an output of the electronic device. For example, the computing devices may determine that a particular communications module should be reset or reinitialized, that a data rate or latency of a particular electronic device should be measured, or that the particular electronic device should be bypassed. In some implementations, the action may be sending a notification to an operator or supervisor, e.g., sending a text message, e-mail, or other notification. In some implementations, the action may be to set an alarm signal.

After determining the action, the computing devices can generate an instruction for performing the action for the electronic device of the communication network and provide the instruction for performing the action to the appropriate electronic device.

In some implementations, the system can request permission from a user before providing the instruction to the electronic device. For example, in addition to determining the action, the computing devices generate data indicating an interactive control for display in the user interface. The interactive control can be, for instance, a graphical menu, a radio button, a selectable icon, a slider, spinner, check box, or another graphical control element that can be displayed in the graphical user interface of the display and which can be selected by the user (e.g., by a mouse-click or screen-touch).

The computing devices can then transmit the data indicating the interactive control, along with an indication of the determined action, to the client device for display in the user interface. The indication of the determined action can be, for example, a message or dialog box including a text description of the action.

If the user determines that the indicated action should be performed, the user can interact with the interactive control displayed by the client device (e.g., by selecting the control or otherwise indicating that the action should be performed). The computing devices can receive data indicating the selection of the interactive control and, based on receiving the data, generate the instruction for performing the action and provide the instruction to the electronic device.

In some implementations, the computing devices can determine the action using one or more machine learning models that have been trained based on training data from the communication network or from another network. In some implementations, the training data can indicate a condition of the network during a previous time period, as well as characteristics of the network during the previous time period. For example, the training data can indicate that the network was in a degraded state during the previous time period and that while the network was degraded, one or more modules were in an error state. The training data can also indicate any network actions that are associated with the indicated network condition, such as corrective network actions that were performed to restore the network to proper operating condition or trouble-shooting actions that were performed to determine the cause of the network degradation.

Based on analyzing the one or more predicted measures of network health for a future time and the one or more characteristics of the communication network, the machine learning models can output an action for an electronic device of the network. In some implementations, the outputs of multiple machine learning models are aggregated to determine the action for the electronic device.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method performed by one or more computers, the method comprising:
    determining, by the one or more computers, a predicted traffic amount for a communication network for each time period in a series of multiple time periods, the predicted traffic amount being determined based on a time series of historical measured traffic for the communication network for multiple time periods;
    measuring, by the one or more computers, a traffic amount for the communication network for each time period in the series of multiple time periods;
    generating, by the one or more computers, network health scores for the multiple time periods, wherein each of the network health scores corresponds to a different time period in the series of multiple time periods, and wherein each of the network health scores indicates a level of health of the communication network during the corresponding time period, and wherein each network health score is generated using (i) the predicted traffic amount for the corresponding time period and (ii) the measured traffic amount for the corresponding time period;
    generating, by the one or more computers, a feature vector of status information for the communication network for each time period in the series of multiple time periods, wherein each of the feature vectors is indicative of a status of network elements of the communication network during the corresponding time period; and
    training, by the one or more computers, a machine learning model based on the feature vectors and the network health scores for the multiple time periods, wherein the training adjusts parameters of machine learning model to obtain a trained machine learning model that is enabled to (i) receive, as input to the trained machine learning model, a feature vector of status information for a first time period and (ii) output a predicted network health score that the trained machine learning model generates in response to receiving the received feature vector, wherein the predicted network health score indicates a level of health of the communication network that is predicted to occur at a time period after the first time period corresponding to the received feature vector.

2. The method of claim 1, wherein training the machine learning model comprises using the network health scores for the multiple time periods as training targets, and wherein each of the network health scores for the multiple time periods serves as a training target for output provided in response to input of a feature vector indicating a status at a time period prior to the time period the network health score describes.

3. The method of claim 2, wherein training the machine learning model involves using a predetermined time offset between an input to the machine learning model and the training target for output of the machine learning model, such that each of the network health scores serves as a training target for a corresponding input feature vector for a time period that precedes the time period of the network health score by the predetermined time offset.

4. The method of claim 1, comprising determining a current feature vector indicative of current status of network elements of the communication network; and
providing the current feature vector as input to the trained machine learning model to obtain, from the trained machine learning model, a predicted network health score indicating predicted level of health of the communication network at a future time period.

5. The method of claim 1, wherein generating the network health scores for the multiple time periods comprises generating each of the network health scores as a ratio of (i) the predicted traffic amount for the corresponding time period and (ii) the measured traffic amount for the corresponding time period.

6. The method of claim 1, wherein the network health scores for the multiple time periods are respectively generated on a periodic basis as each new time period in the series of multiple time periods elapses.

7. The method of claim 1, further comprising, after training the machine learning model, using the machine learning model to generate the predicted network health score for the communication network; and altering a configuration one or more components of the communication network based on the predicted network health score.

8. The method of claim 1, wherein determining the predicted traffic amount comprises determining the predicted traffic amount based on output of one or more traffic forecasting machine learning models that are different from the trained machine learning model, wherein the one or more traffic forecasting machine learning models trained, based on time series data for historical traffic of the communication network, to output data indicating a predicted traffic amount for a time indicated through input to the one or more traffic forecasting machine learning models.

9. The method of claim 1, wherein determining the predicted traffic amount comprises determining, as the predicted traffic amount, a weighted average of predicted traffic amounts from multiple machine learning models that each have been trained based on the time series of historical measured traffic of the communication network, wherein the multiple machine learning models include models of at least two different types from among a set of model types consisting of a linear regression model, a neural network model, and a random forest regressor.

10. The method of claim 1, wherein the communication network is a satellite communication network.

11. The method of claim 1, wherein generating the network health scores comprises generating network health scores that each quantify a level of network health of the communication network that is present during the time period corresponding to the network health score.

12. The method of claim 1, wherein generating the network health scores comprises generating network health scores that each indicate how forecasted traffic for the corresponding time period differs from actual traffic during the corresponding time period.

13. One or more non-transitory computer-readable media storing instructions that are operable, when executed by one or more computers, to cause the one or more computers to perform operations comprising:
determining, by the one or more computers, a predicted traffic amount for a communication network for each time period in a series of multiple time periods, the predicted traffic amount being determined based on a time series of historical measured traffic for the communication network for multiple time periods;
measuring, by the one or more computers, a traffic amount for the communication network for each time period in the series of multiple time periods;
generating, by the one or more computers, network health scores for the multiple time periods, wherein each of the network health scores corresponds to a different time period in the series of multiple time periods, and wherein each of the network health scores indicates a level of health of the communication network during the corresponding time period, and wherein each network health score is generated using (i) the predicted traffic amount for the corresponding time period and (ii) the measured traffic amount for the corresponding time period;
generating, by the one or more computers, a feature vector of status information for the communication network for each time period in the series of multiple time periods, wherein each of the feature vectors is indicative of a status of network elements of the communication network during the corresponding time period; and
training, by the one or more computers, a machine learning model based on the feature vectors and the network health scores for the multiple time periods, wherein the training adjusts parameters of machine learning model to obtain a trained machine learning model that is enabled to (i) receive, as input to the trained machine learning model, a feature vector of status information for a first time period and (ii) output a predicted network health score that the trained machine learning model generates in response to receiving the received feature vector, wherein the predicted network health score indicates a level of health of the communication network that is predicted to occur at a time period after the first time period corresponding to the received feature vector.

14. The one or more non-transitory computer-readable media of claim 13, wherein training the machine learning model comprises using the network health scores for the multiple time periods as training targets, and wherein each of the network health scores for the multiple time periods serves as a training target for output provided in response to input of a feature vector indicating a status at a time period prior to the time period the network health score describes.

15. The one or more non-transitory computer-readable media of claim 14, wherein training the machine learning model involves using a predetermined time offset between an input to the machine learning model and the training target for output of the machine learning model, such that each of the network health scores serves as a training target for a corresponding input feature vector for a time period that precedes the time period of the network health score by the predetermined time offset.

16. The one or more non-transitory computer-readable media of claim 13, wherein the operations comprise:
   determining a current feature vector indicative of current status of network elements of the communication network; and
   providing the current feature vector as input to the trained machine learning model to obtain, from the trained machine learning model, a predicted network health score indicating predicted level of health of the communication network at a future time period.

17. The one or more non-transitory computer-readable media of claim 13, wherein generating the network health scores for the multiple time periods comprises generating each of the network health scores as a ratio of (i) the predicted traffic amount for the corresponding time period and (ii) the measured traffic amount for the corresponding time period.

18. A system comprising:
   one or more computers; and
   one or more non-transitory computer-readable media storing instructions that are operable, when executed by the one or more computers, to cause the one or more computers to perform operations comprising:
      determining, by the one or more computers, a predicted traffic amount for a communication network for each time period in a series of multiple time periods, the predicted traffic amount being determined based on a time series of historical measured traffic for the communication network for multiple time periods;
      measuring, by the one or more computers, a traffic amount for the communication network for each time period in the series of multiple time periods;
      generating, by the one or more computers, network health scores for the multiple time periods, wherein each of the network health scores corresponds to a different time period in the series of multiple time periods, and wherein each of the network health scores indicates a level of health of the communication network during the corresponding time period, and wherein each network health score is generated using (i) the predicted traffic amount for the corresponding time period and (ii) the measured traffic amount for the corresponding time period;
      generating, by the one or more computers, a feature vector of status information for the communication network for each time period in the series of multiple time periods, wherein each of the feature vectors is indicative of a status of network elements of the communication network during the corresponding time period; and
      training, by the one or more computers, a machine learning model based on the feature vectors and the network health scores for the multiple time periods, wherein the training adjusts parameters of machine learning model to obtain a trained machine learning model that is enabled to (i) receive, as input to the trained machine learning model, a feature vector of status information for a first time period and (ii) output a predicted network health score that the trained machine learning model generates in response to receiving the received feature vector, wherein the predicted network health score indicates a level of health of the communication network that is predicted to occur at a time period after the first time period corresponding to the received feature vector.

19. The system of claim 18, wherein training the machine learning model comprises using the network health scores for the multiple time periods as training targets, and wherein each of the network health scores for the multiple time periods serves as a training target for output provided in response to input of a feature vector indicating a status at a time period prior to the time period the network health score describes.

20. The system of claim 19, wherein training the machine learning model involves using a predetermined time offset between an input to the machine learning model and the training target for output of the machine learning model, such that each of the network health scores serves as a training target for a corresponding input feature vector for a time period that precedes the time period of the network health score by the predetermined time offset.

* * * * *